United States Patent
Bruno et al.

[15] 3,652,140
[45] Mar. 28, 1972

[54] THRUST BEARINGS

[72] Inventors: Maris Bruno; Maris Gianfranco, both of C. So Vittoria Emanuele 74 Michelangelo Bovi, Turin, Italy

[22] Filed: Oct. 23, 1970

[21] Appl. No.: 83,471

[30] Foreign Application Priority Data

Oct. 30, 1969 Italy....................5389 A/69

[52] U.S. Cl. ...........................................308/219
[51] Int. Cl. ........................................F16c 27/08
[58] Field of Search ................308/225, 230, 231, 219

[56] References Cited

UNITED STATES PATENTS 3,449,030  6/1969  Tiraspolsky et al...................308/230

Primary Examiner—Martin P. Schwadron
Assistant Examiner—Frank Susko
Attorney—Michael S. Striker

[57] ABSTRACT

Device for supporting a shaft rotating with axial thrust jointly with another shaft alongside and parallel, the first shaft being longer than the second, characterized by the fact that the said second shaft is supported by two pluralities of thrust bearings inserted between the collars of two series of bushes, said bushes being supplied with radial collars, one inner series being mounted radially firm but axially solidable on said second shaft and the other series of external bushes being mounted radially firm and axially solidable mounted on a cylinder fixed to or removable from a body.

3 Claims, 1 Drawing Figure

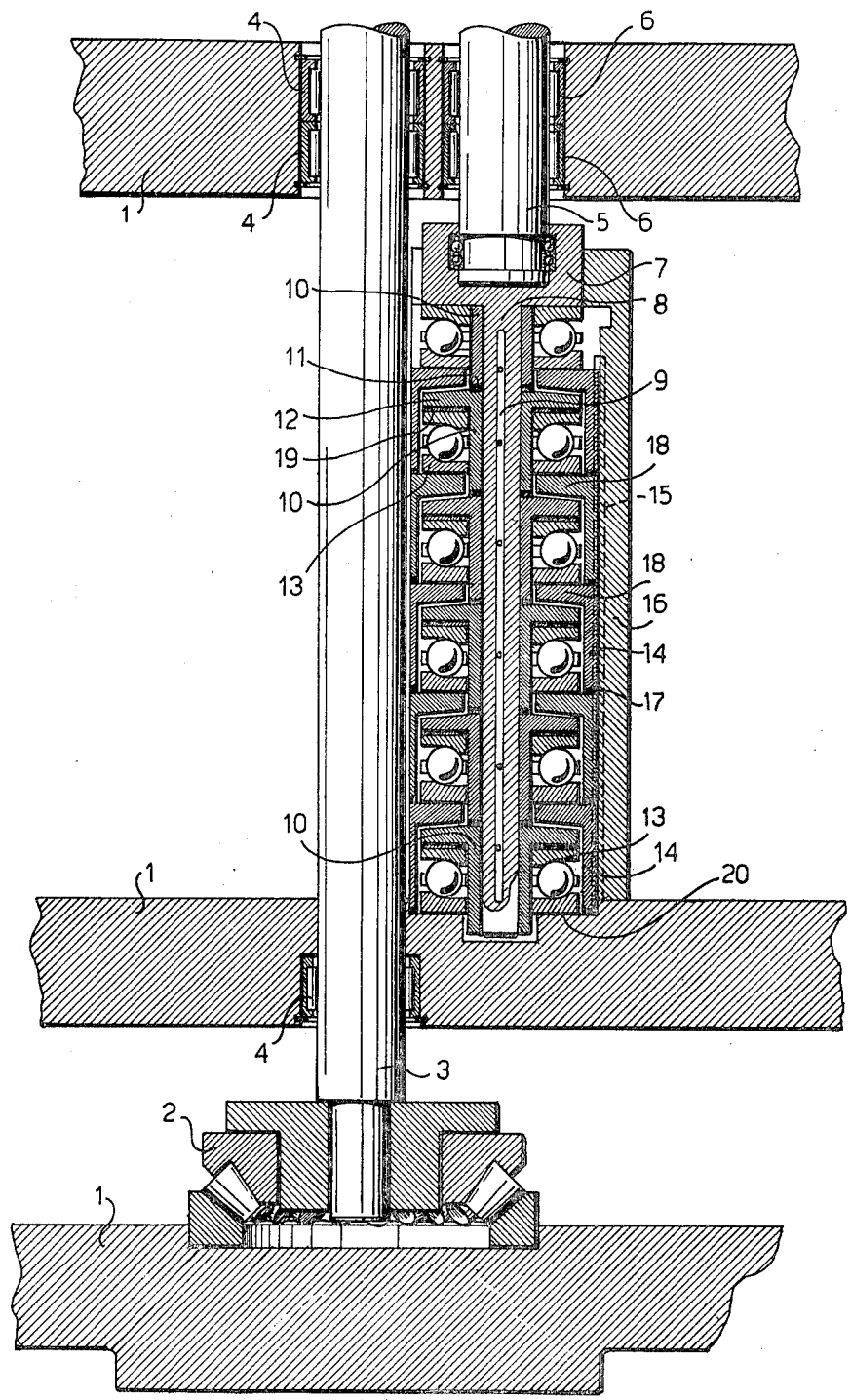

THRUST BEARINGS

In machines for the drawing, extrusion and mixing of materials, particularly plastic materials, in which the feeding of the material in the form of granules, powder or a paste is carried out by means of a pair of shafts, each bearing an Archimedean or other form of screw, said screws fitting into each other and enclosed within a chamber for the compression or mixture of the material, the axes receiving axial thrust are very close and, at least in the case of one of the shafts, there is no room for the mounting of journal and thrust bearings.

In the device which is the subject of the present invention one shaft is extended in such a way as to project beyond the end of the second shaft, the end of the longer shaft being supported by a bearing or bearings whose size is not dependent on the space between the two shafts, whereas the other shaft, for which there is not sufficient space for the mounting of a journal and thrust bearing of a size adequate to the load of the said second shaft, is supplied, in succession, each in contact with the next, with a series of identical inside bushes, the same being mounted firmly on the said second shaft in the radial sense and able to slide on it axially; each of these inside bushes has a collar whose rear radial surface supports the front face of a corresponding journal and thrust bearing.

The rear face of this bearing rests on the front face of the respective collar of an outer bush fixed firmly to and sliding axially within an inner chamber firmly attached to the body of the machine. The outer bushes are likewise in series contact with each other and identical. The number of both the inner and the outer bushes will be in function of the number of bearings employed.

The head of the last outer bush and the rear face of the last bearing rest against the body of the machine, and it is against this wall that the assembly of bearings and inner and outer bushes react.

Rings of elastic or flexible material are inserted between the various bushes, and other rings of a similar material are inserted between the collar face of the bushes and the faces of bearings. The shaft loads are distributed on the various bearings and are by them transmitted by means of the bushes onto the body of the machine.

The elastic or flexible rings are inserted to take up any possible play between the bearings and the bushes.

According to another version of the invention, the cylinder with the outer bushes may be removably mounted on the body with the shaft on which the inner bushes and the bearings are applied, and may be provided with joints to connect it with the shaft bearing the Archimedean or other form of screw, so that it can be withdrawn together with the cylinder.

It is thus possible to arrange, within a small space, a group of journal and thrust bearings whose capacity is equal to that of the bearing of the other shaft.

Other details and advantages of the invention will become clear from the attached drawing and the following description, both of with are presented by way of illustration only and are not to be interpreted as limiting the scope of the invention.

The FIGURE is a plan of the device that is the object of the invention is longitudinal section. The section of the shafts bearing the Archimedean or other form of screw and the drive group has been omitted from the said FIGURE.

With reference to figure: the symbol 1 is used to distinguish the body of the machine, while the symbol 2 is employed for the thrust bearing of the first shaft 3, supported by three journal bearings 4. A second shaft 5 is supported by two journal bearings 6. Shaft 5 has its rear part splined into the head 7 of a shaft 8. The said shaft 8 has a lengthwise keyway 9 for the radial, but not the axial, locking of five inner bushes 10, a ring of elastic or flexible material 11 being interposed between the same.

The inner bushes 10 have a collar 12 supporting the front face of the thrust bearings 13.

Five outer bushes 14 are firmly mounted radially, but free to slide axially, by means of a lengthwise keyway 15 on a cylinder 16 mounted on the body 1.

Elastic or flexible rings 17 are interposed between the bushes 14. The bushes 14 have a collar 18 supporting the rear face of the thrust bearings 13.

Between each inner bush 10 and its corresponding outer bush 14 there is a journal and thrust bearing 13, an elastic or flexible ring 19 being interposed between the face of the said bearings 13 and the collars 12. The rear face of the last bearing 13 and the end of the last outer bush 14 rest in a seating 20 in the body 1.

The axial thrusts of the shaft 5 are thus distributed on the various inner bushes 10 and outer bushes 14, and on the bearings 13, and are thus absorbed by the body 1.

It will be obvious that the number of bearings 13, inner bushes 10 and outer bushes 14 employed can be varied in accordance with the space available and the calculated loads, and that the cylinder 15 can either be fixed to the body 1 or removable from the same, etc., without in this way going outside the ambit of the present invention.

What I claim:

1. Device supporting a shaft under axial thrust rotating alongside a second shaft, with their axes close together, the first-mentioned shaft being longer than the second, wherein the said second shaft is supported by a plurality of thrust bearings inserted between the collars of two series of bushes, said bushes being supplied with radial collars: one, inner, series of such bushes being mounted radially firm but axially slidable on the said second shaft, and the other, outer, series of bushes being mounted radially firm but axially slidable on a cylinder fixed to or removable from a body.

2. Device for supporting a shaft under axial thrust rotating alongside a second shaft, with their axes close together, the first shaft being longer than the second, in accordance with claim 1, wherein elastic or flexible rings are inserted between the contacting surfaces of the inner bushes and the contacting surfaces of the outer bushes.

3. Device for supporting a shaft under axial thrust rotating alongside a second shaft, with their axes close together, the first shaft being longer than the second, in accordance with the preceding claims, wherein elastic or flexible rings are inserted between one or both faces of the thrust bearings and the collars of the inner and/or the outer bushes.

* * * * *